March 9, 1937.    H. E. TAUTZ    2,073,430
SCROLL SAW
Filed May 22, 1935    3 Sheets-Sheet 1
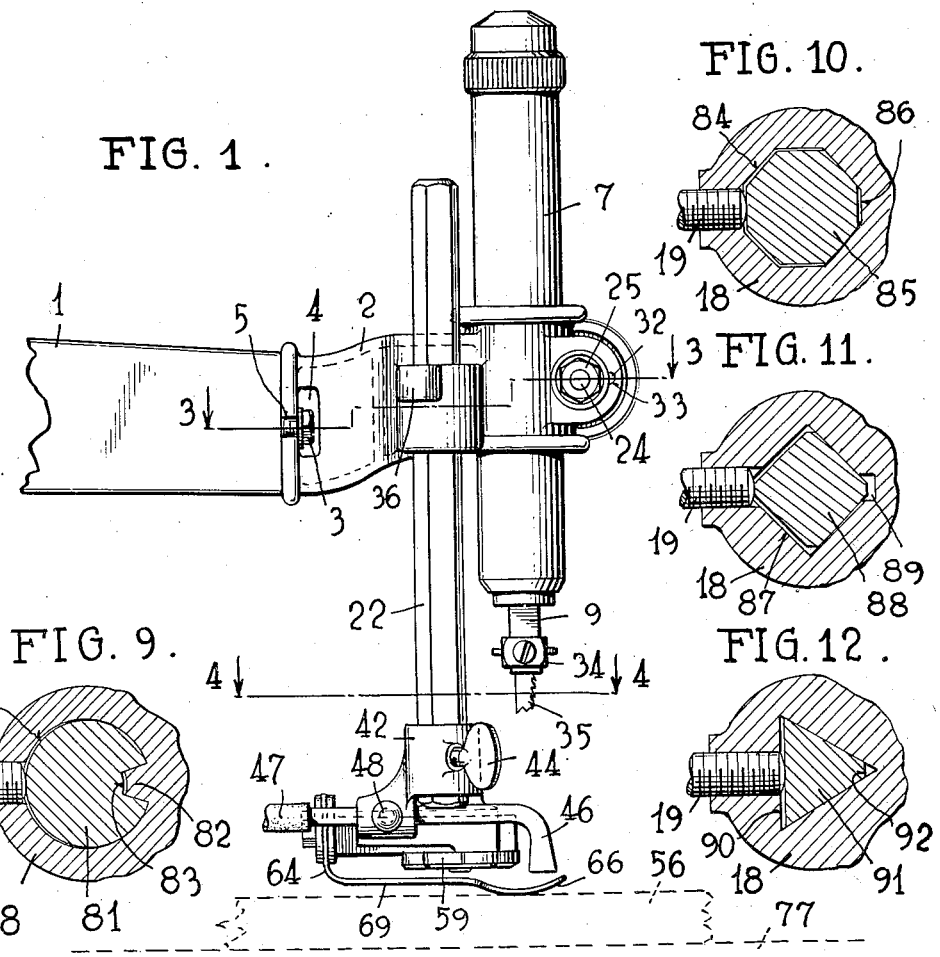
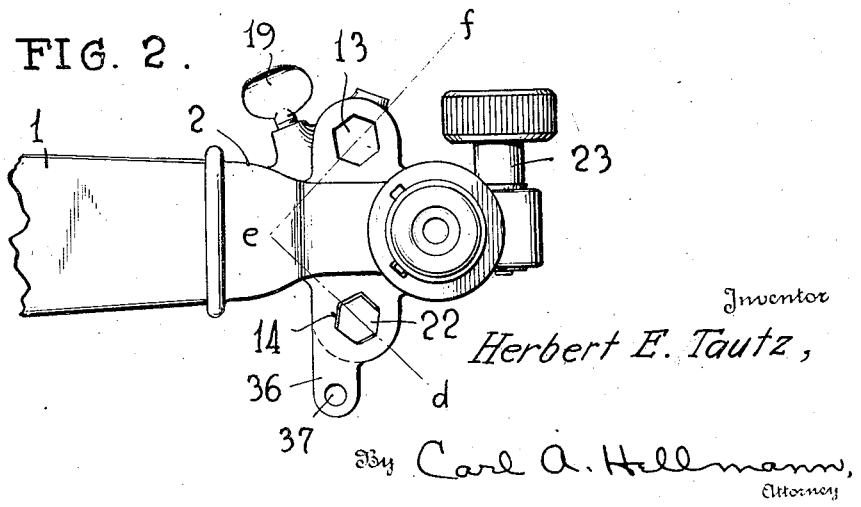
Inventor
Herbert E. Tautz,
By Carl A. Hellmann,
Attorney

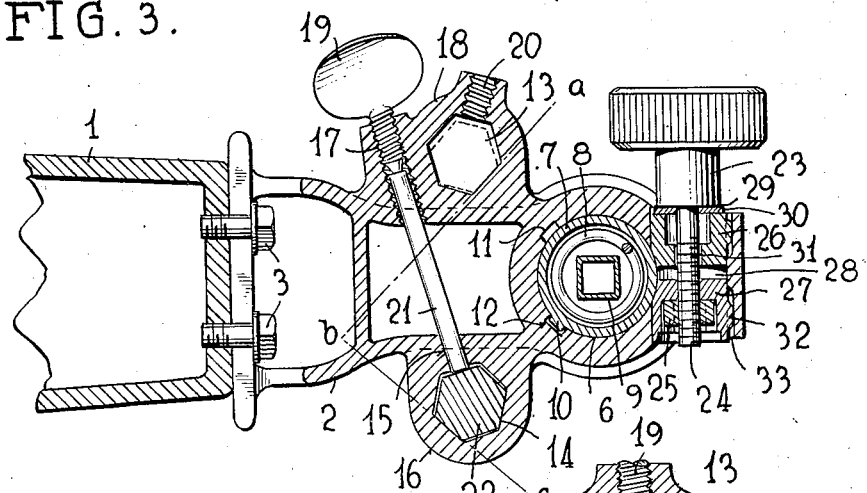
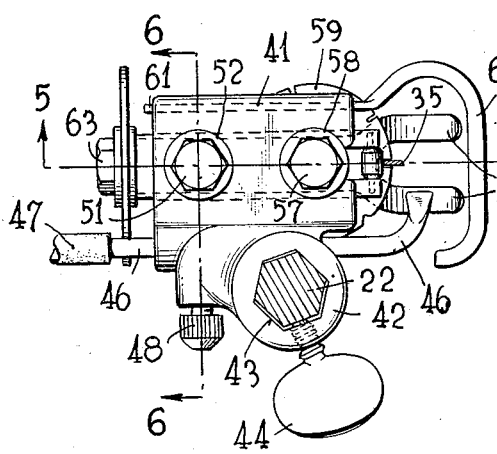
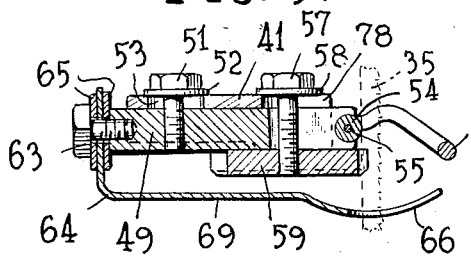
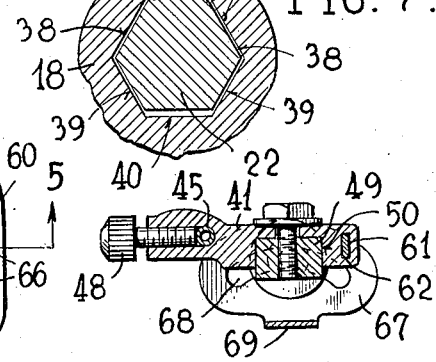
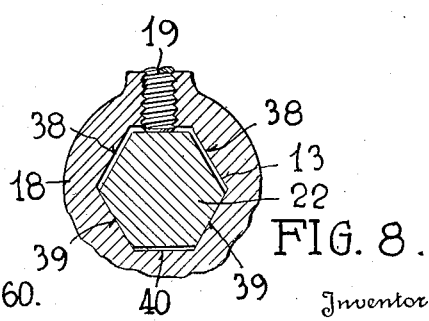

March 9, 1937. H. E. TAUTZ 2,073,430
SCROLL SAW
Filed May 22, 1935 3 Sheets-Sheet 3
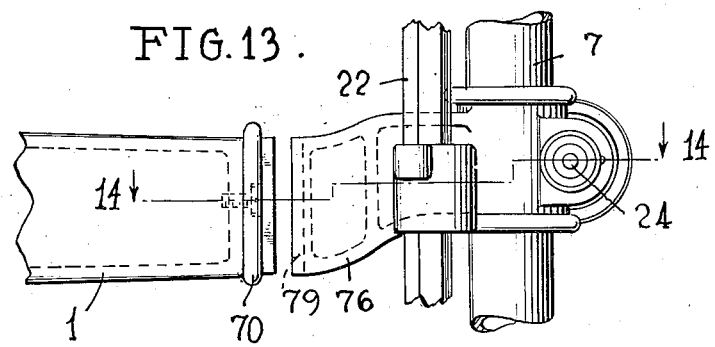
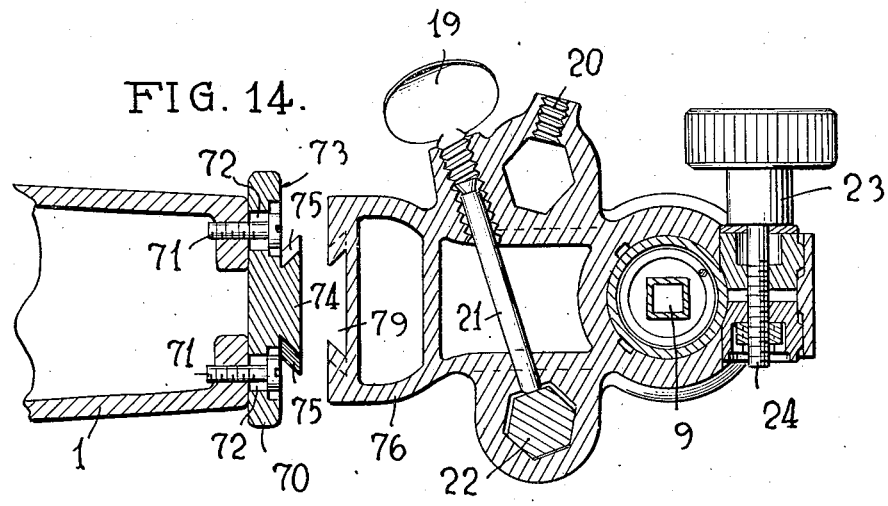
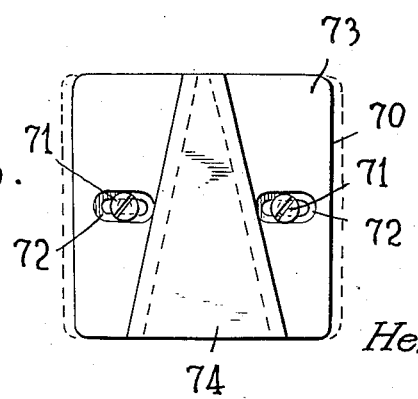
Inventor
Herbert E. Tautz,
By Carl A. Hellmann,
Attorney Patented Mar. 9, 1937

2,073,430

UNITED STATES PATENT OFFICE 2,073,430

SCROLL SAW

Herbert E. Tautz, Milwaukee, Wis., assignor to Delta Manufacturing Company, Milwaukee, Wis.

Application May 22, 1935, Serial No. 22,823

12 Claims. (Cl. 143—70)

This invention relates to scroll saws.

More specifically it relates to improvements in the structure of the head of a scroll saw, particularly one of the type shown, for example, in my prior Patents Nos. 1,877,705, 1,964,651, and 1,964,652.

Still more specifically, one feature of the present invention relates to an improved supporting means for the guide and presser foot, etc., which cooperates with the saw blade of the scroll saw, and also improvements in the structure of the said parts themselves, as well as in the means for clamping said support to the head of the scroll saw.

A specific object is to provide a support of this kind which will automatically resume certain definite positions with respect to the saw blade and workpiece after such adjusements have been disturbed, thus making it possible to remove, adjust and replace such support without disturbing the set-up of the workpiece on the saw table.

A further object is to provide means for supporting such structure in such way that it may automatically assume at will two different positions with respect to the central longitudinal plane of the machine to facilitate turning the saw blade into two positions at right angles to one another.

Another feature of the invention relates to making the entire head removable and replaceable without requiring any screws or other fastenings to be loosened or tightened. The object of this feature is to make it possible to remove the entire head with all its connected parts by merely lifting it off the saw, thereby permitting any necessary manipulation or adjustment of the workpiece or the tool and yet providing for a quick replacement of the head, whereupon it becomes rigid with the frame again and resumes its former alinement so that the adjustment of all the parts carried thereby is not disturbed by such removal and replacement of the head as an entirety. This feature, while disclosed in the present case, is, however, claimed in my copending case, Serial No. 22,824, filed of even date herewith.

Further objects and advantages of the invention will be evident from the various features set forth in the present specification and defined in the claims appended thereto.

For a clear understanding of the invention reference is to be had to the accompanying drawings illustrative of a preferred embodiment thereof.

In said drawings:

Fig. 1 is a side elevation of a portion of a scroll saw embodying the invention, namely, the portion ordinarily known as the head, Fig. 2 is a top view of the structure shown in Fig. 1, Fig. 3 is a horizontal section through the structure shown in Fig. 1 on the three parallel planes indicated by the line 3—3 of Fig. 1, Fig. 4 is a cross sectional plan view of the structure shown in Fig. 1, the section being made on the plane indicated by the line 4—4 of Fig. 1, Fig. 5 is a detail vertical sectional view through the structure shown in Fig. 4 on the line 5—5, Fig. 6 is a sectional view of the device shown in Fig. 4, the section being made in the vertical plane indicated by the line 6—6, Fig. 7 is a diagrammatic section showing the new form of guide and clamping device employed in the invention, the parts being shown with the supporting rod unclamped, Fig. 8 is a similar diagrammatic view showing the position assumed by the parts when the rod is clamped, Figs. 9-12 inclusive are diagrammatic sectional views similar to Fig. 8, but showing clamping devices with rods and bore of other cross sectional shapes, in the positions assumed by the parts when the respective rods are clamped, Fig. 13 is a fragmentary side elevation of a modified form of construction of the head and the adjacent end of its supporting arm, the parts being shown slightly separated laterally for clearness of illustration, Fig. 14 is a sectional view corresponding to Fig. 13, the section being made in the broken horizontal plane indicated by the line 14—14 and Fig. 15 is a front elevation of a plate for securing the head to the frame.

In the various figures similar parts are designated by the same reference characters.

Referring now particularly to Figs. 1, 2 and 3, reference character 1 designates a partly broken away end portion of an upper portion of a scroll saw frame and 2 is a supporting member which may be secured to the end of the frame 1 in any desired manner, for example, by means of cap screws 3 threaded into the frame 1 and bearing against a portion of the member 2 which may be slotted as at 4 and 5 to accommodate such cap screws, the slots 4 and 5 being made of sufficient size to permit a slight degree of adjustment so that the element 2 may be moved into the proper position to provide correct alinement of the saw blade and its operating mechanism. Reference to Fig. 3 shows that two such cap screws 3 are provided and also shows how the member 2 may be adjusted laterally while Fig. 1 shows the possibility of slight vertical adjustment due to the slight play between the shanks of the screws 3 and the edges of the slot 5.

It will be noted that the member 2 is provided with a bore 6, best shown in Fig. 3, to receive the housing 7, which carries the spring 8 and the reciprocating plunger 9, the structure of these parts being disclosed in the prior patents hereinabove referred to and forming no part of the present invention. The housing 7 is preferably provided with a key-like projection or feather 10 which may engage in either of the slots 11 or 12 in the member 2, said slots being so positioned that shifting the said feather from one to the other will turn the housing 7 through an angle of 90° about its longitudinal axis.

The member 2, which is preferably made hollow to decrease its weight and cost, is also provided with two hexagonal bores 13 and 14, arranged on opposite sides of the member, as shown in Fig. 3. While the adjacent sides of these hexagonal bores are preferably arranged at angles of 120° to one another, in a preferred embodiment the lengths of the sides are, however, not all equal, two of them preferably being longer, and a third being shorter than the remaining three, for a reason which will be explained in greater detail hereinafter.

A bore 15 is formed in the boss 16, which contains the bore 14 and a further bore 17 in alinement with the bore 15 is provided in the boss 18, which has the bore 13 formed therein. The bore 17 is threaded to receive a thumb screw 19 and the boss 18 is provided also with an additional bore 20 likewise threaded to fit the same thumb screw 19 so that said thumb screw may be interchanged from one of these bores to the other when desired. A rod 21 is engaged within the alined bores 15 and 17 and is of sufficient length to cooperate with the thumb screw 19 so that by manipulating said screw 19 a hexagonal rod 22 in the bore 14 may be clamped or released, while the same rod 22 when inserted in the bore 13 may be clamped or released by means of the same thumb screw 19 which for this purpose may be shifted to the bore 20.

Of course, if preferred an additional thumb screw identical in all respects with 19 may be left permanently in the threaded bore 20, in which case it would not be necessary to shift the thumb screw from one bore to another and this will have the further advantage that the thrust rod 21 cannot accidentally drop out and become lost.

Attention is called to the arrangement of the hexagonal bores 13 and 14, which are so oriented that the sides of one are in planes perpendicular to corresponding sides of the other. This relationship is illustrated by the dot and dash lines a b and b c in Fig. 3. The purpose of this arrangement will be explained hereinafter.

The housing 7 may slide freely up and down in the bore 6 of the member 2 in the orientation determined by the key 10 and one or other of the slots 11 and 12, and may be clamped in its adjusted position by the mechanism shown at the right in Figs. 1, 2 and 3. As best shown in Fig. 3 this mechanism comprises the knurled head screw 23 having its threaded shank 24 engaged in a correspondingly threaded nut 25. Two cup-shaped clamping jaws 26 and 27, arranged in a horizontal bore 28, are thus retained between the shoulder 29 of the screw 23 and the nut 25, a washer 30 preferably being interposed as shown. These cup-shaped jaws 26 and 27 are bored as shown at 31 to allow the shank portion 24 of the screw 23 to pass freely therethrough and each jaw has a projection or lug 32 engaged in a slot 33 in the member 2 which will permit said jaws to move in and out, but prevent them from rotating about the axis of the screw 23.

Each of these jaws is preferably shaped to fit the outer surface of the housing 7 where it contacts therewith and it is clear that tightening or loosening the screw 23 will cause said jaws to be drawn together or allowed to separate, thus clamping or releasing the housing 7 in any desired position of adjustment within its bore in the member 2. The reciprocating plunger 9 carries at its lower end a chuck 34 adapted to hold a saw blade or other tool 35 as shown in Fig. 1. The member 2 may be provided with a lug 36 having a bore 37 therein for holding a lamp attachment or the like or for any other purpose, forming no part of the present invention.

It has already been mentioned that the cross sections of the hexagonal bores 13 and 14 are equiangular hexagons, that is, while the angles between adjacent faces are all preferably 120°, nevertheless, the widths of the faces differ.

This is illustrated in a somewhat exaggerated fashion in Figs. 7 and 8. In these figures the rod 22 is a true equilateral hexagon in cross section but it will be noted on referring to Fig. 7, in particular, wherein this rod is arranged with five of its sides spaced uniformly from the corresponding five sides of the bore 13, that the sixth side of the bore is spaced a greater distance from the remaining side of the equilateral hexagon referred to.

The spaces shown in Figs. 7 and 8 are, of course, grossly exaggerated and in actual construction these spaces are barely perceptible, as they need be only sufficient to permit free sliding movement of the rod 22 in the bore 13 when the thumb screw 19 does not hold it. However, when such thumb screw 19 is turned to the positon shown in Fig. 8, whereby the rod 22 is forced against the inside of the bore 13, it will be noted that this rod is in close contact with the two long sides 39 of the bore 13, and that a slight clearance still remains between the short side 40 of the bore and the adjacent face of the hexagonal rod.

The three normal sides 38 of the bore are not in contact with the hexagonal rod 22 when the parts are in the positon shown in Fig. 8. Due to the clearance between 40 and the adjacent face of the rod and due to the intimate contact between the sides 39 of the bore and the adjacent faces of the rod, it is obvious that the hexagonal rod 22 will be held firmly against sliding or tilting by the single screw 19, a result which could not have been secured if both the bore and the rod were equilateral hexagons in cross section, because in such case the most that the thumb screw 19 could accomplish would be to force the rod 22 into intimate contact with the single opposing face of the bore, but this would still permit a slight play in the other directions, namely, the directions normal to the remaining faces of the rod and bore. It will be noted that inasmuch as the rod 22 is equilateral it may be inserted in the bore in any desired one of six possible positions, while still providing firm clamping in each such position in the manner already described in detail. An important feature is that the narrow face of the bore should be opposite to the face carrying the thumb screw.

By arranging the two bores 13 and 14 as shown in Figs. 2, 3 and 14, wherein the faces of one hexagonal bore form an angle of 30° with the corresponding faces of the other and wherein the narrowest faces of the bores are located opposite to the side at which the thumb screw, or the rod actuated by the thumb screw, enters, it becomes possible to insert the rod 22 in either bore at an orientation forming an angle of 90° to that assumed in the other bore and to clamp the rod firmly in either of such two positions.

It will be noted also that the said bores are located with their axes at the same distance from the axis of the saw plunger 9, so that shifting the rod from one of these bores to the other, meanwhile rotating it through 90°, will shift all the mechanism carried by said rod through the same angle, to agree with the right angle rotation of the tube or housing 7, already referred to. The bores 13 and 14 are, of course, also so arranged that the direction from the axis of one to the axis of the saw plunger is at right angles to the corresponding direction for the other, as shown in the figures already referred to. The advantages of this construction and spacing of such parts will be clearly explained when the operation of the device is described hereinafter.

Referring now to Figures 1, 4, 5 and 6 there is shown in these figures the structure which is carried by the lower end of the rod 22 and which accomplishes several purposes by combining several corresponding structures.

It will be noted that this device, which comprises a main or body portion 41, having an extension 42 thereon provided with a bore 43 of modified hexagonal shape, similar to that shown in Figs. 7 and 8, may be secured to the rod 22 by the thumb screw 44. Element 41 is provided with a bore 45 adapted to receive the sawdust-blowing nozzle tube 46 which is connected by means of a rubber tube 47 or the like to a suitable compressor built into the scroll saw, the details of which, however, form no portion of the present invention. This nozzle tube 46 may be adjusted in the bore 45, both rotatably and longitudinally and may be secured in its adjusted position by means of the screw 48.

A bar 49 is arranged to be slidable in a correspondingly shaped groove 50 in the body member 41 and a cap screw 51, provided with a suitable washer 52, is threaded into said bar, this structure being best shown in Fig. 5. It will be noted that there is an elongated slot 53 in the upper portion of the body 41, through which the threaded portion of the cap screw 51 passes loosely, thus permitting the bar 49 to slide in the groove 50 when the cap screw 51 is loosened, while permitting such screw to hold the parts firmly together when any desired adjustment has been made. The bar 49 carries at its forward end a roller 54 mounted upon a pin 55, this roller providing an anti-friction thrust bearing surface against which the back of the saw blade 35 may rest when the device is in operation.

At the other end of the bar 49 is a threaded bore into which fits a cap screw 63 which serves to retain the hold-down 64 in position between two washers 65 arranged on opposite sides of the upwardly bent portion 67 of the hold-down. The hold-down is preferably made of a resilient material and has an arcuate slot 68 in the vertical portion 67, and a substantially horizontal forwardly extending resilient portion 69 terminating in an enlarged bifurcated end at 66. By reason of the arcuate slot 68 it is possible to clamp this hold-down in any desired position within the range of said slot. The forked portion 66 is preferably bent into a downwardly convex curved shape as shown best in Fig. 5, and the saw blade 35 passes between the arms 66 of the fork with ample clearance.

A similar cap screw 57 having a washer 58, is threaded at its lower end into a metallic guide disc 59 having a number of radial slots of various sizes, and the top portion of the body member 41 is preferably provided with a slot 78 open at its forward end, whereby the guide disc 59 may be adjusted forward or back and rotated into any desired position and then secured in such position by proper operation of the cap screw 57.

The disc 59 will be turned to bring the proper one of its peripheral slots into correct alinement with the back of the saw blade 35 and the bar 49 must likewise be adjusted so as to bring the bearing roller 54 into proper position to cooperate with and support the rear of the said saw blade.

The body member 41 may also have a guard 60 secured thereto, this guard being of the shape best shown in Fig. 4. The portion that is visible when in use is preferably circular in cross section, but in order to prevent the guard from turning about its support the remainder of the guard 60 is preferably flattened as shown at 61, Figs. 4 and 6, and passed through a correspondingly shaped slot 62 in the body member 41. Adjustment of this guard in a forward and back direction is thus provided, while at the same time rotation thereof is prevented. It is found that this guard is supported with sufficient rigidity by mere frictional insertion into its receiving bore in the body member so that no holding screws or other securing means are necessary.

Referring now to the modified form of rod clamping device shown in Fig. 9 it will be noted that the boss 18 is provided with a substantially circular bore 80 interrupted, however, by an inwardly extending fin or key 82 having tapered sides which may, if desired, converge toward the center of the bore 80. This bore receives a rod 81 which is also circular and of proper size to slide readily in the bore 80, this rod taking the place of rod 22 of Fig. 1. The rod 81 has a groove or keyway formed therein adapted to receive the key 82 and leave a slight clearance as shown at 83, even when the parts are clamped together by the thumb screw 19, to cause the sides of the keyway to engage firmly against the corresponding faces of the key 82. Due to the fact that engagement takes place on the sides of the key, while the bottom of the keyway is not yet in engagement with the top of the key, it is evident that a clamping action similar to that secured with the rod 22, in the position shown in Fig. 8, is provided.

In Fig. 10 the boss 18 is shown provided with an octagonal bore 84 adapted to receive an octagonal rod 85, which is slidable therein when the thumb screw 19 is released. The octagonal bore 84 may have one face 86 thereof, opposite to the thumb screw 19, shorter than the remaining faces so as to produce a result similar to that shown in Fig. 8 when the rod 85 is clamped by the thumb screw 19, that is, there will be a slight clearance left between said short side 86 of the bore and the adjacent face of the rod 85, so that firm engagement of rod 85 will be secured exactly as in the case of the hexagonal rod 22, shown in Fig. 8.

Referring now to Fig. 11 there is illustrated diagrammatically a boss 18 provided with a substantially square bore 87 coöperating with a substantially square rod 88 slidable therein. Preferably the corners of the square rod may be slightly flattened as shown and preferably also a slot or key way 89 of any desired shape may be provided in the boss 18 adjacent that corner of the square rod 88 which is opposite the thumb screw 19 so as to provide a clearance preventing particularly the adjacent corner of the rod from coming in contact with the bore and again assuring rigid clamping contact between two sides of the square rod 88 and the two adjacent faces of the bore 87.

Fig. 12 illustrates a still further modification wherein the boss 18 is provided with a substantially triangular bore 90 slidably receiving a rod 91 also substantially triangular, but preferably truncated at one corner as shown at 92, this corner 92 being the one on the side opposite that face of the triangular rod 91 upon which the end of the thumb screw 19 bears when the rod is clamped. Here the clearance provided adjacent the flattened surface 92 is sufficient to permit intimate clamping of the rod 91 against two faces of the bore 90.

In all these figures it will be understood that for clearness of illustration the clearance between the bore and the rod has been greatly exaggerated and that in actual practice it would be difficult to detect, by the unaided eye, that there is any difference in dimensions of the rods and the bores into which they fit slidably.

It is clear that these various shapes are merely illustrative and that numerous other shapes, both polygonal and curved, could be employed, if desired, instead of the hexagonal rod 22 and corresponding bore, of Figs. 1, 2, 3, 4, 7, 8 and 14, for instance, the underlying principle being the same in all cases, namely, the feature of providing a clearance on the side of the bore opposite that side at which the thumb screw 19 enters, so as to provide firm engagement between at least two faces of the rod and two corresponding faces of the bore. Except where some other meaning is definitely required by certain of the claims, it will be understood that the precise shapes of the rods and of the bores are immaterial and that the inventive feature resides in the conception of providing such clearance opposite the thumb screw.

Referring now to Figs. 13, 14 and 15 there is illustrated the end of the frame 1 corresponding to that shown in Fig. 1, but instead of making the head 2 in a single piece as shown in Figs. 1 and 2, this structure is now made in two pieces connected so as to be quickly detachable from and attachable to one another, this being accomplished by means of a tapered dovetail joint.

A plate 70 is secured to the end of the frame 1 by means of screws 71 passing through elongated slots 72 formed in said plate, as shown in Figs. 14 and 15. These slots are provided with counterbored portions of sufficient depth to cause the heads of the screws 71 to project no further than the surface 73, so that there will be no obstruction extending beyond said surface when the screws are in position. The slots 72 provide a sufficient range of lateral adjustment of the plate 70 with respect to the frame 1.

The male dovetail 74 formed on the plate 70 has a double taper, namely, the side surfaces 75 taper inwardly toward the plate and also taper toward one another in an upward direction as clearly shown in Figs. 14 and 15. The female dovetail coöperating therewith and formed as a groove 79 in the other portion of the head designated generally by reference character 76, is of corresponding shape and size as indicated by the cross-sectional view in Fig. 14.

These parts are so arranged that when the two dovetails are fitted into one another the portion of the head 76 will aline properly with the plate 70 to form a combined structure practically identical with that shown in Figs. 1 and 2, with the difference that this structure is readily separable by merely sliding the female portion 76 upwardly out of engagement with the remaining portion 70.

The tapers are so selected that the parts will not bind, this being accomplished by providing sufficiently steep tapers. The result will be that the parts are held together with sufficient rigidity for all actual use, but that the parts can be readily detached at will, the portion 76, of course, carrying along the rod 22 and the mechanism carried thereby, these parts being the same as those shown in Fig. 1.

Having now described the structural features of the present invention, the operation will readily be understood.

When the saw blade 35 is set into reciprocatory movement by the mechanism of the scroll saw, not shown, the workpiece 56 which is being cut will be fed to said blade along the table top 77. The hold-down 64 will have its convex forked portion 66 bearing resiliently against said workpiece 56, this being accomplished by suitably adjusting the height of the hexagonal bar 22. This holds the workpiece firmly to the table and prevents jumping or chattering during the sawing operation.

If the sawing is to be done at an angle, instead of transversely through the workpiece, the table 77 may be tilted to the proper inclination. In order to cause the hold-down to still maintain proper contact with the upper surface of the workpiece 56 when the table is tilted, said hold-down is shifted by means of its slot 68 with respect to the cap screw 63 until the bifurcations 66 stand at the same angle as the workpiece, whereupon the rod 22 may be lowered to bring the hold-down into proper resilient contact with the workpiece as before.

Where the workpiece 56 is too long to be sawed with the parts in the position shown in Fig. 1, that is, if the workpiece 56 is longer than the distance from the saw blade to the rear vertical end of the frame 1, it becomes necessary to turn the saw blade to a position at right angles to the one shown in Fig. 1. As this shifting of the saw blade, which is accomplished by turning the casing 7 in the head 2, would cause the saw blade 35 to come into position to interefere with the hold-down, it is necessary to move this hold-down also into a position parallel to the new position of the saw, that is, a position at right angles to its former one. This is accomplished very readily and accurately by merely removing the rod 22 from the bore 14 and inserting it in the bore 13. Due to the relationship between the said bores already explained, it is clear that by thus shifting the rod from one bore to the other and at the same time turning it through 90°, the new position assumed by the rod 22 will automatically bring the hold-down and the other parts carried by the rod 22 into proper position to cooperate with the saw blade in its new operating position.

Reference to Fig. 2 will show that the diagonal of the rod 22 which formerly occupied the position indicated by the line e—d can automatically be shifted into a direction at right angles thereto, as indicated by the line e—f.

The thumb screw 19 will afford a secure grip between the rod 22 and the head 2 by virtue of the peculiar construction of the bores 13 and 14.

In certain classes of work, especially where saw cuts start in apertures in the workpiece with no saw cut leading to an edge of said workpiece, it becomes necessary to remove one such opening from the saw blade and to substitute another, this operation sometimes being necessary a large number of times on a single workpiece. In the ordinary saw constructions heretofore customary this shifting is very tedious, inasmuch as it is necessary to readjust the blade after every removal thereof. By the construction of the removable head shown in Figs. 13 to 15 this difficulty is entirely obviated, as the saw blade may be retained within the jaws of the lower chuck or operating member which reciprocates it, and merely the upper chuck 34 loosened, whereupon the entire upper head and the operating portions connected therewith may be lifted bodily off from the saw, permitting the workpiece to be removed from the saw and if necessary reinserted with the saw blade extending through another hole in the workpiece without, however, disturbing the alinement of the saw blade in any way, so that upon replacing the removable portion 16 of the head upon the plate 70 and merely reclamping the saw blade 35 in the chuck 34, the saw will again be in proper position and alinement to proceed with the work.

Having described the invention it will be understood that certain features thereof may be employed without a corresponding use of the remaining features thereof and that modifications, additions, and omissions of various kinds may be made therein without departing from the spirit of the invention; therefore, for an understanding of what is covered by the invention reference should be had to the following claims:

I claim:

1. A machine tool head having a hexagonal bore therein, said bore being formed with its adjacent faces at substantially equal angles to one another, there being a clamping device piercing one face of the bore, and the face of the bore opposite said clamping means being narrower than the remaining faces.

2. A machine tool head having a hexagonal bore therein, said bore being formed with its adjacent faces at substantially equal angles to one another, there being a clamping device piercing one face of the bore, the face of the bore opposite said clamping means being narrower than the remaining faces, and a rod of regular hexagonal cross section fitting slidably in said bore.

3. A machine tool head having a hexagonal bore therein, said bore being formed with its adjacent faces at substantially equal angles to one another, a rod of regular hexagonal cross section fitting slidably in said bore, there being a clamping device piercing one face of the bore, and the face of the bore opposite said clamping means being narrower than the adjacent face of the rod.

4. A machine tool head having a hexagonal bore therein, said bore being formed with its adjacent faces at substantially equal angles to one another, a rod of regular hexagonal cross section fitting slidably in said bore regardless of which face of the rod is adjacent any face of the bore, there being a securing device passing through one face of the bore and the face of the bore opposite said securing device being narrower than the adjacent face of the rod.

5. A machine tool head having a plurality of hexagonal bores therein, each bore being formed with its faces at substantially equal angles to one another, there being a clamping device piercing one face of each bore, and the face of each bore opposite said respective clamping means being narrower than the remaining faces, the faces of one bore being in planes at right angles to those of the corresponding faces of another bore.

6. A machine tool head having a guide for a tool therein and having two hexagonal bores therein, each bore being parallel to the axis of the tool guide and being formed with its faces at substantially equal angles to one another, there being a clamping device piercing one face of each bore, and the face of each bore opposite said respective clamping means being narrower than the remaining faces, the faces of one bore being in planes at right angles to those of the corresponding faces of the other bore, the axes of the bores being equally distant from the axis of the tool guide and the plane passing through the axis of the tool guide and the axis of one bore being at right angles to the plane passing through the axis of the tool guide and the axis of the other bore.

7. A clamping device for a rod of regular polygonal cross section comprising a member having an equi-angular bore slidably receiving the rod, two faces of the bore being in intimate contact with two faces of the rod, an intermediate face of the rod being out of contact with any portion of the wall of the bore, and means opposite said intermediate face of the rod to force the rod into frictional contact with the wall of the bore at the said two first-named faces.

8. In a scroll saw, a saw-guiding member having a spring hold-down attached thereto, the said hold-down having fingers at its lower end straddling the blade of the saw, the scroll saw having a tiltable work-receiving table and the spring hold-down being adjustable about an axis parallel to the axis of tilt of the table and located substantially in the plane of the fingers thereby maintaining said fingers straddling the blade and out of contact therewith, to maintain the hold-down parallel to the surface of the table.

9. In a scroll saw, a saw-guiding member having a spring hold-down attached thereto, the scroll saw having a tiltable work-receiving table and the spring hold-down being adjustable about an axis parallel to the axis of tilt of the table to maintain the hold-down parallel to the surface of the table, said spring hold-down having one end thereof bent substantially at right angles to the main portion of the spring, said end portion having an arcuate slot therein, and securing means cooperating with said slot for clamping the spring hold-down at any desired adjusted angle with respect to the saw-guiding member.

10. A clamping device for a rod of regular polygonal cross section comprising a member having a bore slidably receiving the rod, said bore having at least two substantially plane faces at an angle to one another, the rod having at least two corresponding faces adapted to make intimate contact with said faces of the bore, there being sufficient radial clearance between the rod and the bore to make such intimate contact possible, and a means opposite said faces to force the rod into frictional contact with the wall of the bore at the said two first-named faces.

11. In a scroll saw having a tiltable work-receiving table and a saw guiding member thereabove adjustable toward and away from said table, a spring hold-down attached to said saw guiding member, said spring hold-down being adjustable about an axis which is parallel to the axis of tilt of the table and is located substantially at the work engaging surface of the hold-down.

12. In a scroll saw having a tiltable work-receiving table and a saw guiding member thereabove adjustable toward and away from said table, a spring hold-down having workpiece engaging fingers at its lower end straddling the blade of the saw, said hold-down being carried by said saw guiding member, said spring hold-down being adjustable about an axis which is parallel to the axis of tilt of the table but is located above the table and at substantially the elevation of the said fingers, whereby the said fingers may be maintained out of contact with the blade even when the table is tilted to a substantial extent, while remaining in a plane parallel to the top of the table, so as to provide a firm hold on a workpiece even when the table is tilted.

HERBERT E. TAUTZ.